United States Patent [19]
Tanaka

[11] Patent Number: 5,995,087
[45] Date of Patent: Nov. 30, 1999

[54] APPARATUS FOR AUTOMATICALLY DECIDING CHARACTERISTIC COLORS OF AN IMAGE

[75] Inventor: Sumiyo Tanaka, Osaka, Japan

[73] Assignee: Minolta Co., Ltd., Osaka, Japan

[21] Appl. No.: 08/927,021

[22] Filed: Sep. 10, 1997

[30] Foreign Application Priority Data

Sep. 11, 1996 [JP] Japan ................................. 8-240369
Apr. 1, 1997 [JP] Japan ................................. 9-083102

[51] Int. Cl.⁶ ........................................................ G09G 5/06
[52] U.S. Cl. ............................ 345/199; 345/186; 345/431
[58] Field of Search .................................. 345/199, 186, 345/431

[56] References Cited

U.S. PATENT DOCUMENTS 4,689,669 8/1987 Hoshino et al. ....................... 345/199
5,761,655 6/1998 Hoffman .................................. 707/4

FOREIGN PATENT DOCUMENTS 5-274372 10/1993 Japan .
08016789 1/1996 Japan ............................... G06T 7/00
8-016789 1/1996 Japan .

Primary Examiner—Kee M. Tung
Assistant Examiner—Sy D. Luu
Attorney, Agent, or Firm—Sidley & Austin

[57] ABSTRACT

In order to automatically determine colors representing characteristics of an image, a color table including a plurality of colors is provided, and a color group table including color groups are obtained by classifying the colors included in the color table according to a first standard. Colors included in an image are sampled in image data to be processed based on an image data of the image. Then, a first frequency is counted for each color in the sampled colors belonging to the color table based on the result of the sampling, and a second frequency is counted by summing the first frequencies for the colors included in a color group for each of the color groups belonging to the color group table. Characteristic colors of the image are determined according to the first and second frequencies.

21 Claims, 12 Drawing Sheets

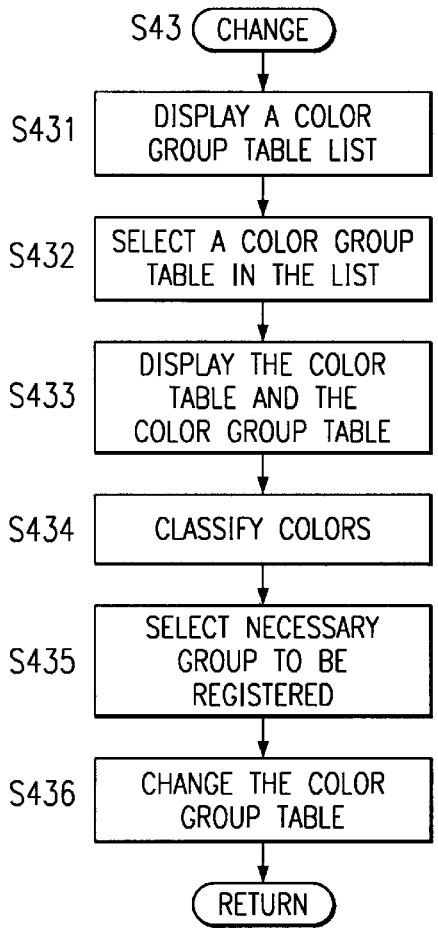
FIG. 15
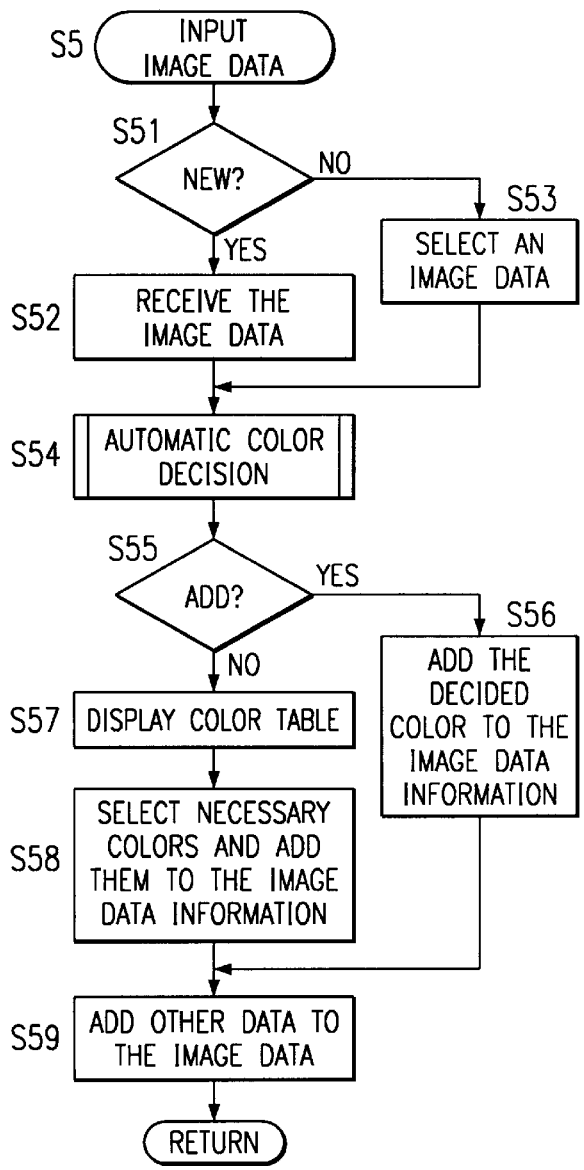
FIG. 17
FIG. 16
| COLOR GROUP TABLE LIST | FIRST COLOR GROUP TABLE |
| --- | --- |
| | SECOND COLOR GROUP TABLE |
| | THIRD COLOR GROUP TABLE |
| | FOURTH COLOR GROUP TABLE |
| | FIFTH COLOR GROUP TABLE |

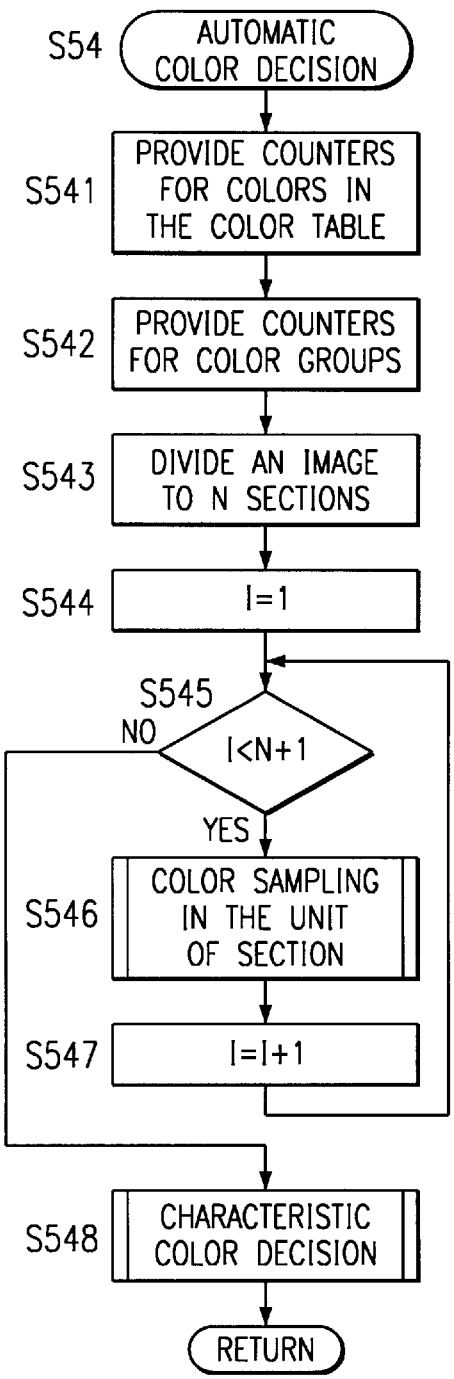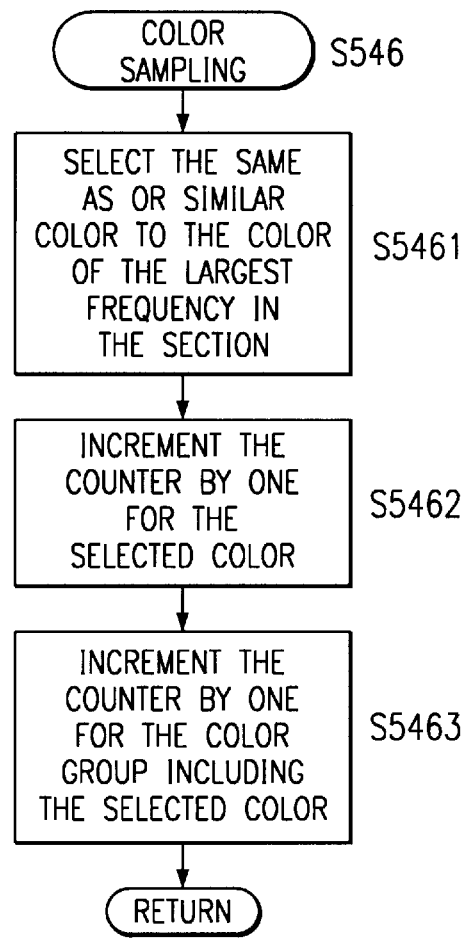

APPARATUS FOR AUTOMATICALLY DECIDING CHARACTERISTIC COLORS OF AN IMAGE

BACKGROUND OF THE INVENTION

1. Field of the Invention

The present invention relates to an apparatus for automatically deciding colors representing characteristics of an image.

2. Description of Prior Art

An image database system is used to store and manage a large amount of image data. In such an image database system, retrieve keys are added to each image data, and a desired image data can be retrieved by using the keys. In addition to a word, an icon or the like, a color representing characteristics of an image is used as the keys. The color means a color specified for example with hue, value and chroma (HLS space).

Previously, colors for the keys representing characteristics of images are decided manually by evaluating each image with eyes by an operator. This work for the evaluation is a large burden when a large amount of image data are dealt for an image database. Further, because the evaluation depends on judgement of the operators, the standards for deciding the colors representing characteristics of images are spread in the operators. Therefore, when such keys are used, it is afraid that proper retrieving result cannot be obtained.

In order to solve the problem, it is proposed to automatically decide colors representing characteristics of an image (hereinafter referred to as "characteristic colors"). For example, in Japanese Patent laid open Publication 5-274372/1993, all the colors in an image are classified by several representative colors, and deviations relative to the entire image are calculated for each representative color based on the frequencies thereof, and the representative color having large (or small) deviation is determined as a characteristic color of the image.

However, because all the colors in the image are classified in several representative colors and characteristic colors are selected among them, this process has a problem that if the number of representative colors is small, the number of characteristic colors to be decided is limited. On the other hand, if the process increases the number of representative colors, then the process will increase the number of characteristic colors. Since the process can utilize more characteristic colors, the process will select only colors that are similar to each other and that have large areas.

SUMMARY OF THE INVENTION

An object of the present invention is to provide an apparatus which can decide characteristic colors from many kinds of colors automatically.

Another object of the present invention is to provide an apparatus which does not select only colors similar to each other even if many colors are selected as the characteristic colors.

In an apparatus of the invention, in order to automatically determine colors representing characteristics of an image, a color table including a plurality of colors is provided, and a first color group table including color groups is obtained by classifying the colors included in the color table according to a first standard. In an image to be processed, colors included in the image are sampled based on an image data of the image. A first counter counts a first frequency for each color in the sampled colors belonging to the color table based on the result of the sampling, while a second counter counts a second frequency by summing the first frequencies for the colors included in a color group for each of the color groups belonging to the color group table. Then, a characteristic color of the image is decided according to the first and second frequencies obtained by the first and second counters.

An advantage of the present invention is that characteristic colors of an image can be decided in various types of colors.

Another advantage of the present invention is that that the process prevents similar colors from being selected as characteristic colors, even if many characteristic colors are selected.

BRIEF DESCRIPTION OF THE DRAWINGS

These and other objects and features of the present invention will become clear from the following description taken in conjunction with the preferred embodiments thereof with reference to the accompanying drawings, and in which:

FIG. 15 is a flowchart of "change";

FIG. 16 is a diagram on an example of a color group table list;

FIG. 17 is a flowchart of "input image data";

FIG. 18 is a flowchart of automatic color sampling;

FIG. 19 is a flowchart of the color sampling of representative colors;

DETAILED DESCRIPTION OF THE PREFERRED EMBODIMENTS

Figure 1:
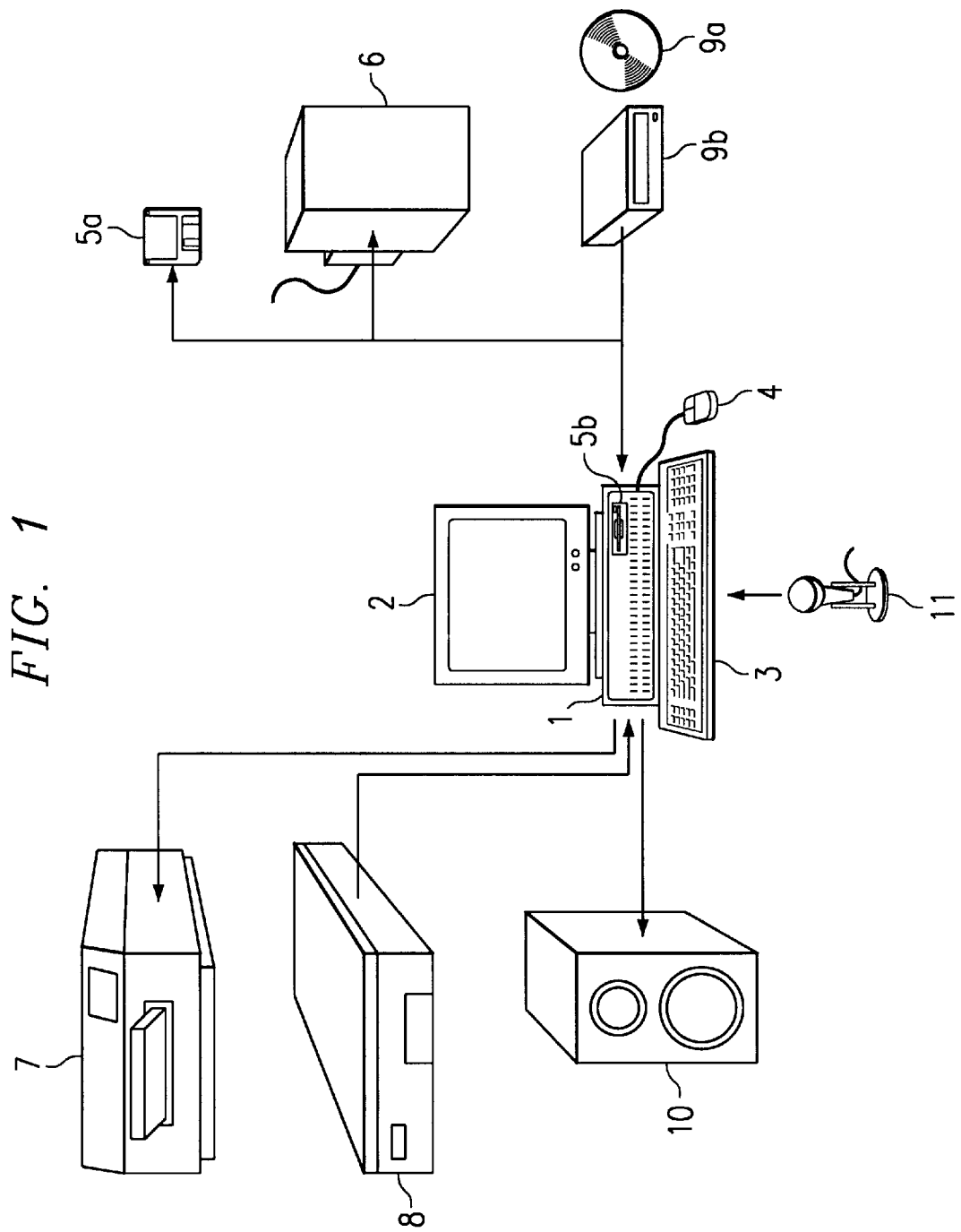
FIG. 1 is a diagram of an information processor.

Referring now to the drawings, wherein like reference characters designate like or corresponding parts throughout the views, FIG. 1 shows an information processor which is operated as an image processor. The information processor has a database management system for image data using a graphical user interface. The system has a controller or computer 1 having a central processing unit (CPU) for controlling the entire system, and the controller 1 is connected through cables to various components 2–11. A display device such as a cathode-ray tube (CRT) 2 displays images and/or characters and various screens for operation. A keyboard 3 and a mouse 4 are used to input various data and instructions. A flexible disk drive 5b writes and reads data to and from a flexible disk 5a as a medium for recording data. A hard disk drive 6 stores image data and retrieve keys therefor. A printer 7 prints an image or the like. A scanner 8 reads an image data from a sheet of document and send it to the controller 1. A CD-ROM drive 9b reads data from a CD-ROM 9a as a medium for recording data. A speaker 10 gives audio output signals, and a microphone 11 receives audio input signals. Arrows in FIG. 1 shows directions of data flow in this system. These components may be integrated with the controller 1.

Figures 2, 3:
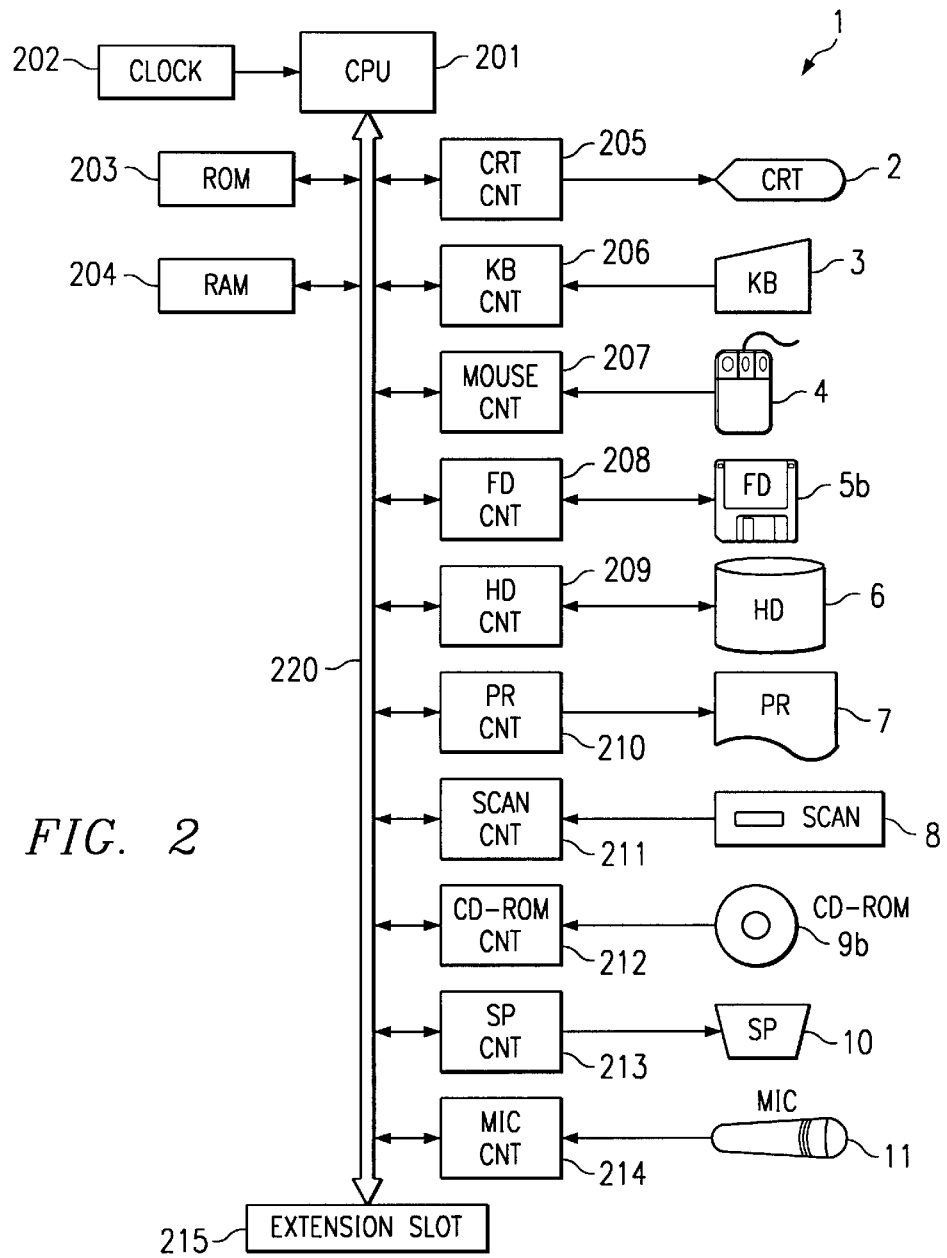
FIG. 2 is a block diagram of the information processor.
FIG. 3 is a diagram of data structure of data stored in a hard disk drive.

FIG. 2 shows a block diagram of the information processor. The controller 1 has a CPU 201 such as Intel i80486DX. The CPU 201 receives clock signals from a clock circuit 202. The CPU 201 is connected through a bus 220 to a read only memory (ROM) 203 for storing a program for deciding characteristic colors automatically and a random access memory (RAM) 204 for storing data and various tables explained later. Further, the CPU 201 is connected to a CRT controller 205 which displays an image or characters in the display device 2, a keyboard controller 206 which transmits key-input signals from the keyboard 3, a mouse controller 207 which transmits input signals from the mouse 4, a flexible disk controller 208 which controls the flexible disk drive 5b, a hard disk controller 209 which controls the hard disk drive 6, a printer controller 210 which controls the printer 7, a scanner controller 211 which controls the scanner 8, a CD-ROM controller 212 which controls the CD-ROM drive 9b, a speaker controller 213 which controls audio output signals to the speaker 10 and a microphone controller 214 which receives signals from the microphone 11. Further, the CPU 201 is connected to extension slots 215. The flexible disk drive 5b, the hard disk drive 6, the scanner 8, the CD-ROM drive 9b and the like may be connected through a SCSI board connected to the slot 215.

In the system explained above, the flexible disk and the hard disk are used as media for recording data. However, a different type of media such as magneto-optic disk may also be used. In a different way, a part or all of the program for the system is stored in the flexible disk or the hard disk, and when the program is run, it may be transmitted to the RAM 204. In such a case, the tables used for the program may be stored directly in the ROM 203, without storing them in the media such as the flexible disk.

In this system, image data are stored and managed in the hard disk drive 6. However, image data stored in the CD-ROM 9a may also be managed directly. In this case, retrieve keys are added to index data which represent the image data stored in the CD-ROM 9a and they are stored in the hard disk drive 6. A set of the index data and the retrieve key is called as a record. When an image data is retrieved, a record is retrieved first based on the retrieve key, and the image data are read from the CD-ROM 9a based on the index data in the retrieved record.

FIG. 3 shows a data structure of data stored in a hard disk in the hard disk drive 6. Three areas 60, 61 and 62 are provided for storing image data, color data and other retrieve data. The area 60 for storing image data stores image data G1, G2, and the like. The area 61 stores color data of colors as retrieve key, such as hue, value and chroma, or data specifying them. For example, the area 61 stores color data $g_{1-1}$, $g_{1-2}$ and the like for the image data G1, and color data $g_{2-1}$, $g_{2-2}$ and the like for the image data G2. Further, the area 62 stores other retrieve keys such as a key-word, a form or the like. For example, the area 62 stores a first keyword and a first form for the image data G1, and a second keyword and a second form for the image data G2.

In the image processor, when characteristic colors of an image are decided, colors are classified into a plurality of color groups, and one color is selected from each group according to frequencies in each color group. Then, characteristic colors can be selected from various kinds of colors. Further, it is prevented that only colors similar to each other are selected even if many colors are selected as the characteristic colors.

It is possible to meet various demand by a user by changing the classification standard of the color groups and the rules for deciding characteristic colors. For example, if a color noticeable but having a small area in an image is desired to be added as one of the characteristic colors, a color group table classified with chroma is used, and characteristic colors are selected from color groups having high chroma and low frequencies.

Figure 4:
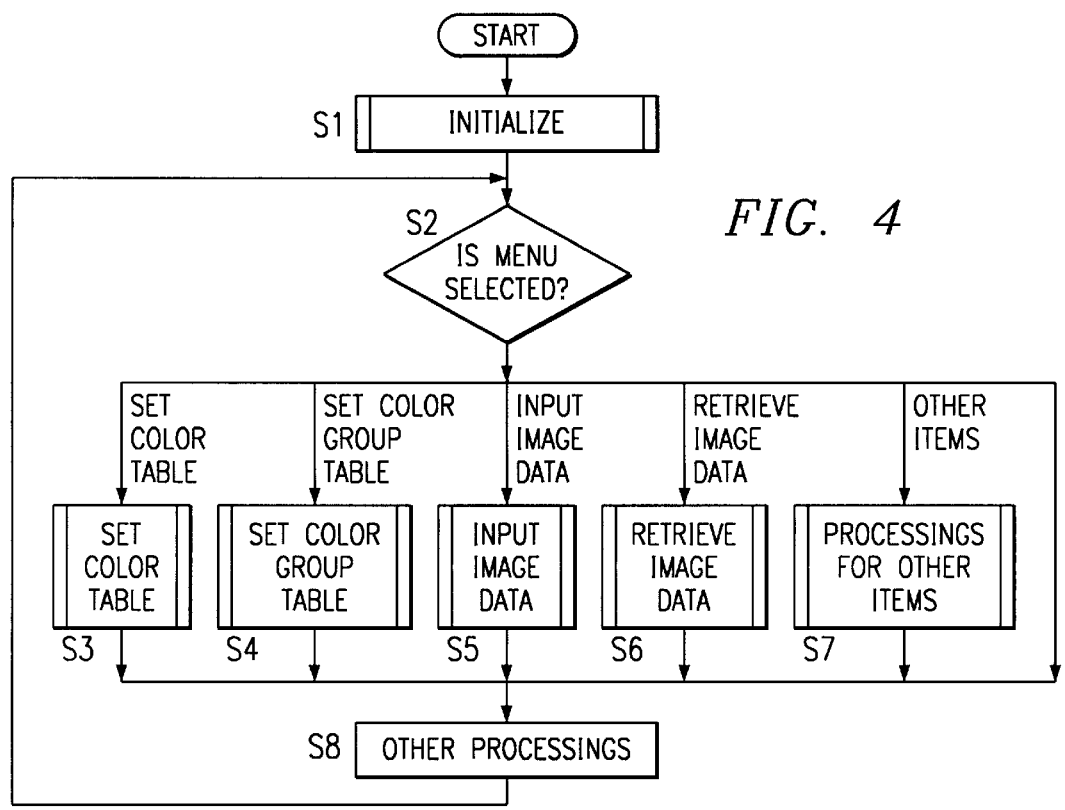
FIG. 4 is a main flowchart of the controller.

Next, processings performed in this system is explained. FIG. 4 shows a flowchart of a main routine performed by the CPU 201 in the controller 1. When the program stored in the ROM 203 is invoked, various parameters in the program are initialized, and an initial screen (not shown) is displayed in the display device 2 (step S1). Second, it is decided if a menu in the initial screen is selected or not (step S2). The menu includes "set color table", "set color group table", "input image data", "retrieve image data" and other menu items. The menu is selected with the keyboard 3 or the mouse 4. When the menu is selected, the flow branches according to the selected menu item to processing of steps S3–S7 explained later in detail. If the menu is not selected, the flow proceeds directly to step S8 for other processings. Then, the flow returns to step S2. The processing for the other menu items (step S7) and the processing for the other processing (step S8) are similar to the counterparts in a prior art information apparatus, and they are not related directly to the invention. Then, they are not explained further here.

Figure 5:
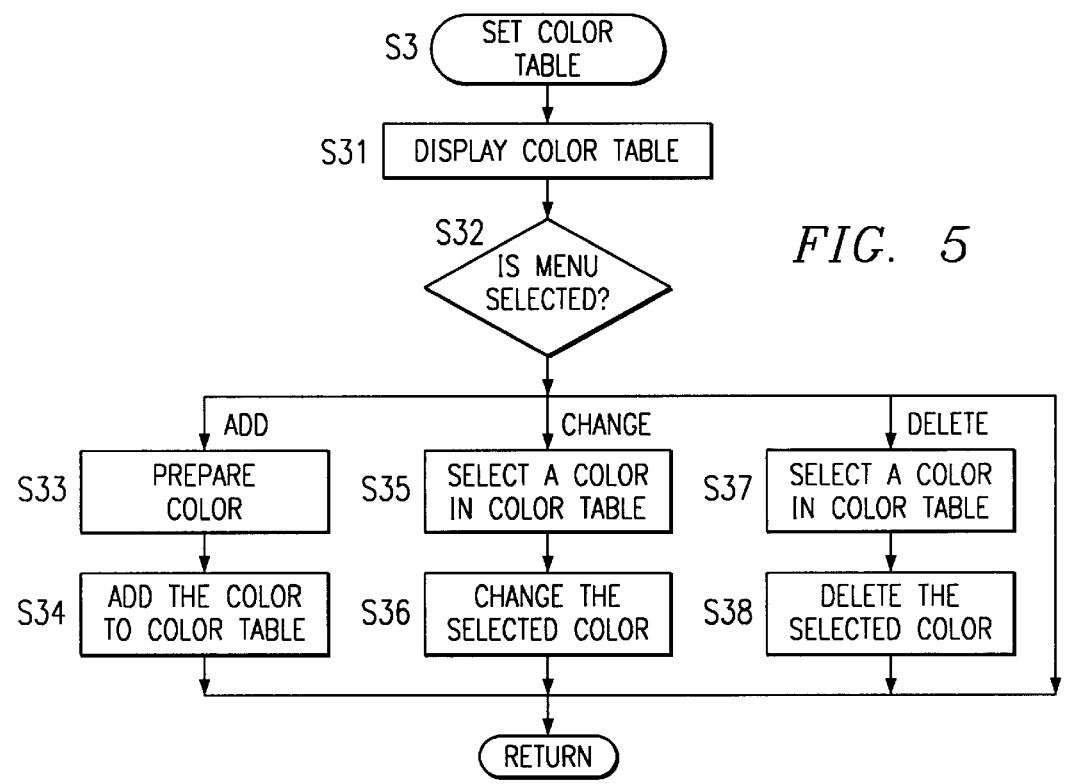
FIG. 5 is a flowchart of set color table.

Next, the processings selected in the menu are explained. FIG. 5 shows a flowchart of "set color table" (step S3 in FIG. 4). All the colors registered in the color table are first displayed in the display device (step S31), and a menu (not shown) for instruction on the color table is also displayed. The menu includes "add", "change" and "delete". Next, it is decided if the menu is selected or not (step S32). The menu is selected with the keyboard 3 or the mouse 4. When the menu is selected, the flow branches according to the selection. If "add" is selected, a color or colors are prepared by specifying hue H, value V and chroma C (step S33), and the colors are added to the color table (step S34). If "change" is selected, a color or colors to be changed are selected in the color table (step S35), and the selected colors are changed on hue H, value V and chroma C and registered in the color table (step S36). At the same time, the relevant colors added to each image data in the hard disk drive 6 and the relevant colors in the color group table are also changed. If "delete" is selected, a color or colors to be deleted are selected in the color table (step S37), and the selected colors are deleted (step S38). At the same time, the relevant colors added to each image data in the hard disk drive 6 and the relevant colors in the color group table are also changed. After S34, S36 or S38, the flow returns to the main routine. If the menu is not selected, the flow returns readily to the main routine.

Figure 6A:
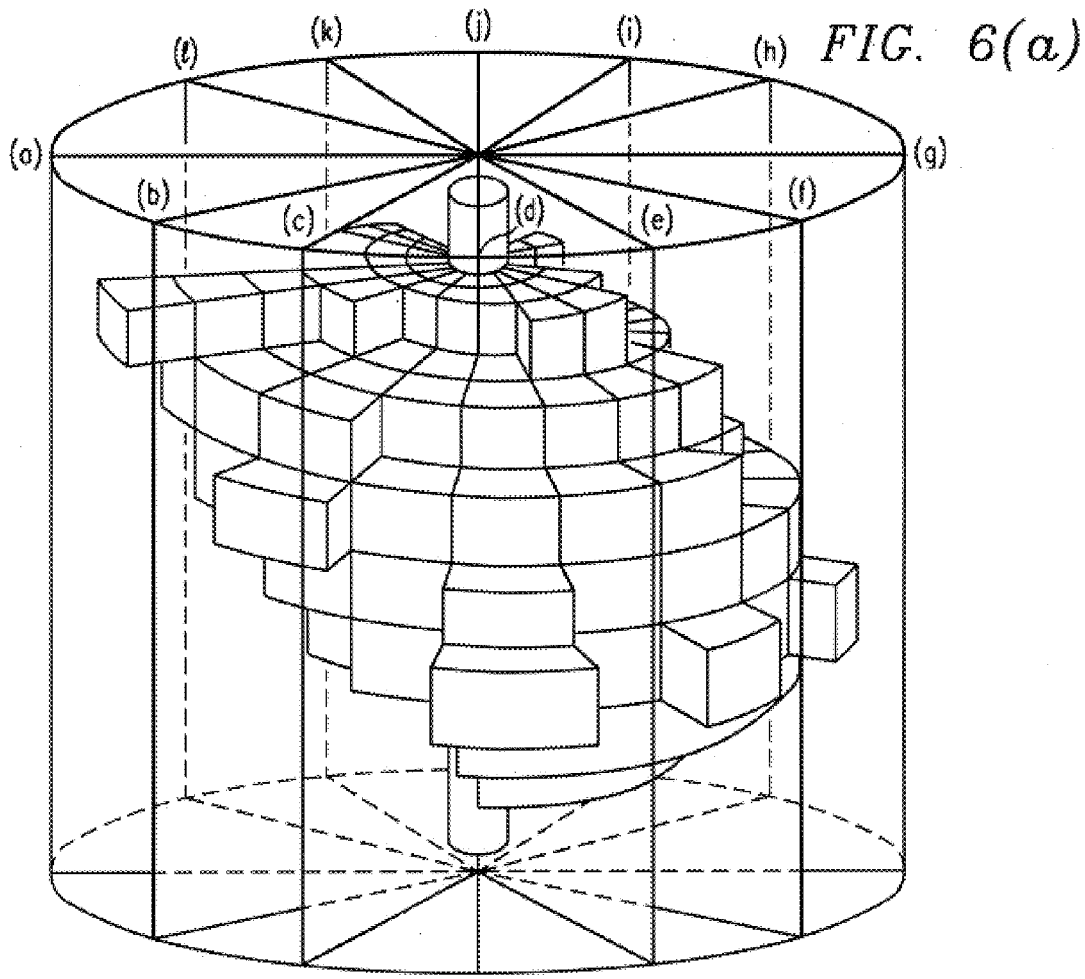
FIG. 6A is a diagram of an example of the color table displayed in the display device represented by a stereo color diagram.
Figure 6B:
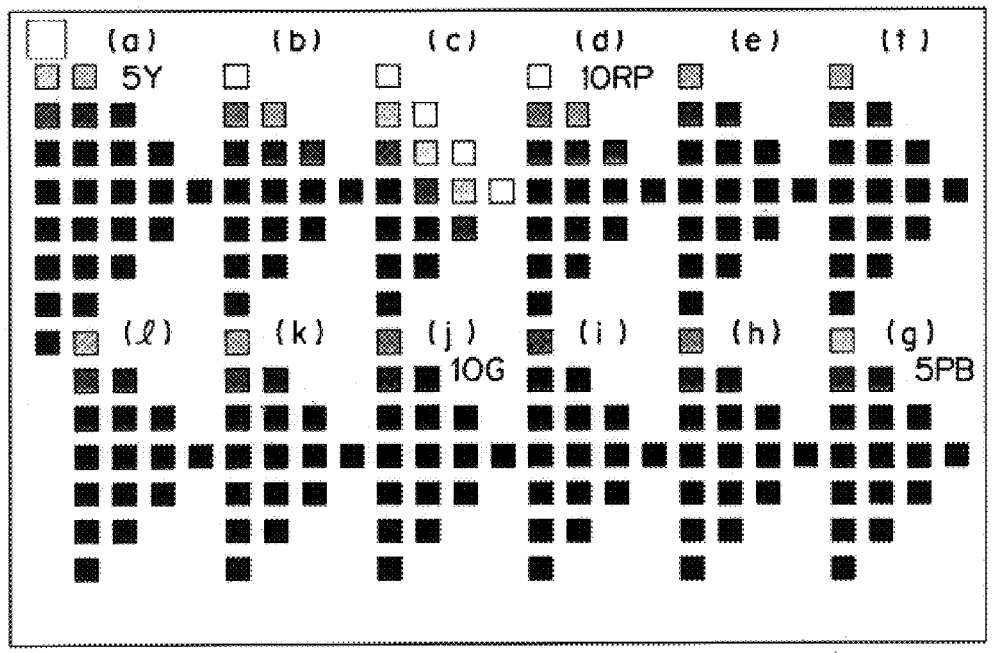
FIG. 6B is a diagram of an example of the color table displayed in the display device represented by twelve hue planes of the stereo color diagram.
Figure 7A:
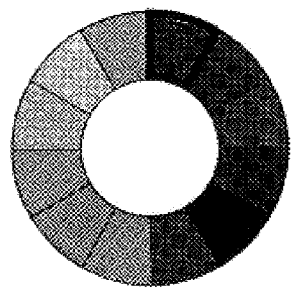
FIG. 7A is a diagram of a hue loop.
Figure 7B:
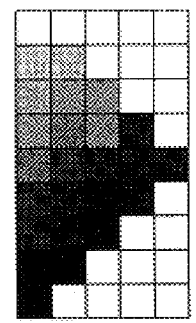
FIG. 7B is a diagram of value and chroma.
Figure 8:
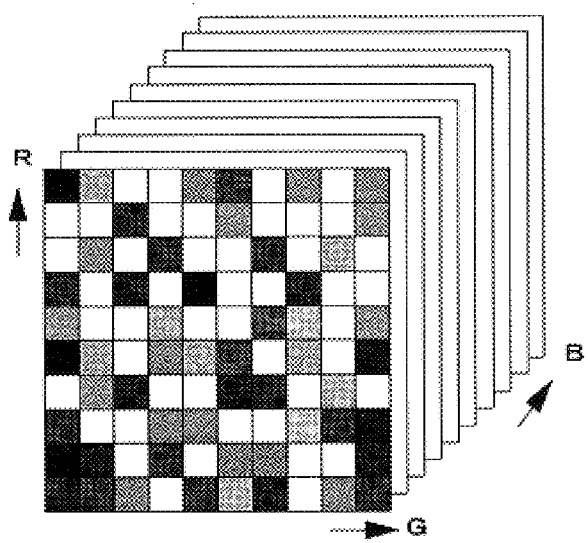
FIG. 8 is a diagram of an example of the color table displayed in the display device.
Figure 9:
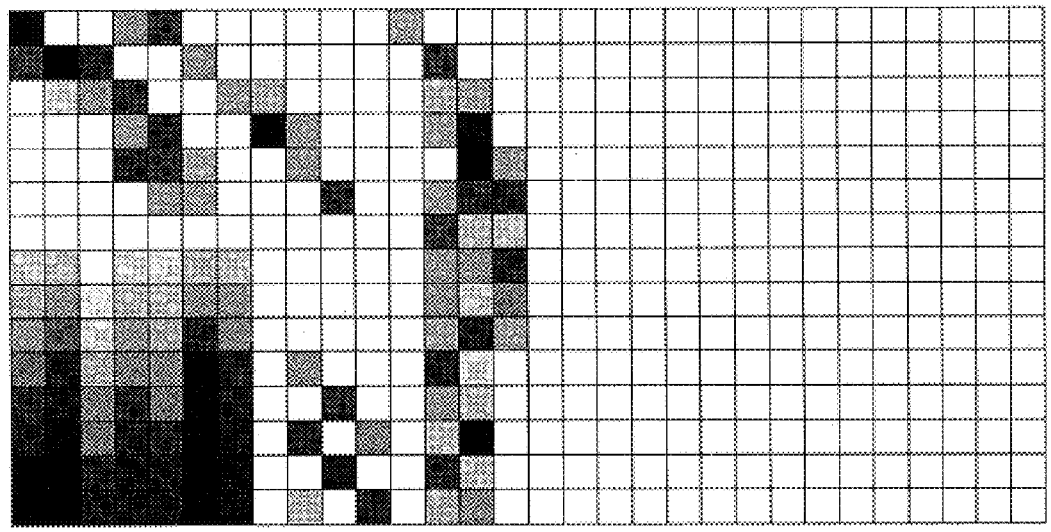
FIG. 9 is a diagram of an example of the color table displayed in the display device.

The color table to be set in this flow is explained further. A "color" is specified with data of, for example, hue, value and chroma. In this example, the color table is a set of colors each specified by hue, value and chroma (HLS space), and only one color table exists in the system. In this flow, colors are added, changed or deleted as to a default color table, in order to provide a color table including colors desired by a user. FIG. 6B shows an example of a color table displayed at step S31. In FIG. 6B, the color table shown below includes colors taken from twelve hue planes (a) to (1) in the stereo color diagram in FIG. 6A. In a different way, a hue loop is displayed as shown in FIG. 7A, and a user selects a color in the hue loop. When a color is selected, as shown in FIG. 7B, a color table is displayed which represents colors of the selected hue in a two-axes plot of value and chroma. In a still different way, as shown in FIG. 8, a color table with axes of red, green and blue is displayed in a two-axes plot of red (R) and green (G) for particular blues (B). The fixed color may be changed to red or green to display a two-axes plot of green (G) and blue (B) for particular reds (R) or a two-axes plot of red (R) and blue (B) for particular greens (G) In a further way, as shown in FIG. 9, a large table is displayed in the display device 2, and a user arranges desired colors in the table based on the color table shown in FIG. 6. It is also possible to provide a plurality of color tables.

In the preparation and change of colors at steps S33 and S36, RGB values of a color may be specified without directly specifying hue H, value V and chroma C.

Further, when a color is added to the color table at step S34, the color to be added may be arranged automatically in a space specified by the hue, value and chroma, or RGB values thereof, or arranged in a specified space, or arranged in an area specified by a user in the color table in the display device 2.

In a different way, an as-received default color table is used without performing the processing of "set color table" (step S3).

Figure 10:
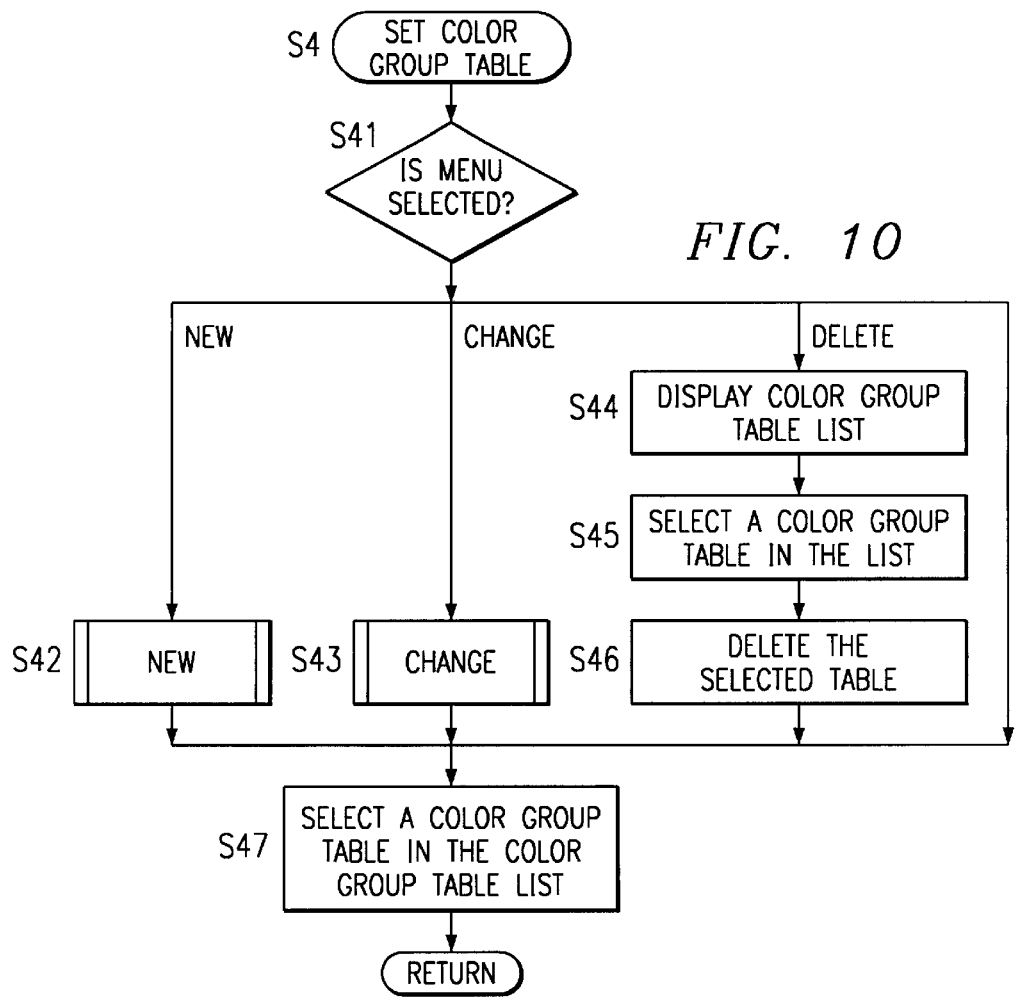
FIG. 10 is a flowchart of "set color group table"
Figure 11:
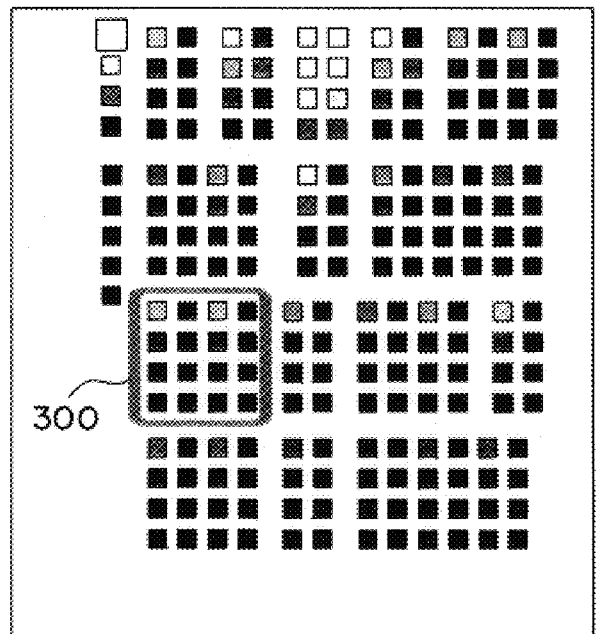
FIG. 11 is a diagram of an example of a color group table displayed in the display device.

FIG. 10 shows a flowchart of "set color group table" (step S4 in FIG. 4). A color group table is a set of a plurality of color groups obtained by classifying the colors in the color table with a standard, and the system includes one or a plurality of color group tables. FIG. 11 shows an example of the color group table. For example, an area enclosed with a line 300 represents one color group. In an example, in a color group table classified with value, colors are classified for example to color groups of light red, dark red, and the like. In another example, in a color group table classified with chroma, colors are classified for example to color groups of vivid red, grayish red, and the like.

Returning to FIG. 10, when "set color group table" is selected, a menu (not shown) for instruction on the color group table is displayed. The menu includes "new", "change" and "delete". Then, it is decided if the menu is selected or not (step S41). The menu is selected with the keyboard 3 or the mouse 4. When the menu is selected, the flow branches according to the selection. If "new" is selected, a color group table is created (step S42). If "change" is selected, a color group table is changed (step S43). If "delete" is selected, a color group table list as shown in FIG. 11 is displayed (step S44), and a color group table to be deleted is selected in the list by a user (step S45). Then, the selected color group table is deleted (step S46). After S42, S43 or S46, the flow proceeds to step S47. If the menu is not selected, the flow proceeds directly to step S47. Then, the color group table list is displayed, and a user selects a color group table to be used in the automatic color decision (step S47). Then, the flow returns to the main routine. In a different way, only a default color group table is used without performing the "set color group table" processing (step S4 in FIG. 4).

Figure 12:
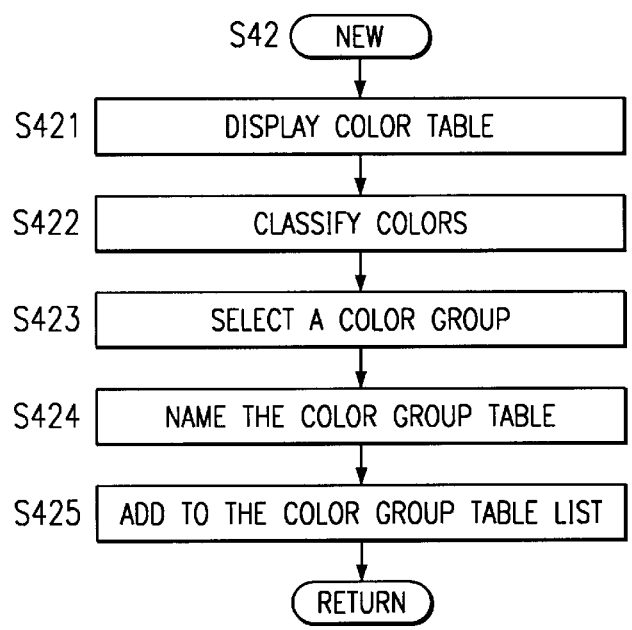
FIG. 12 is a flowchart of "new"

FIG. 12 shows a flowchart of the selection of "new" (step S42 in FIG. 10). If "new" is selected, a color table is displayed (step S421). Then, a user classifies colors displayed in the color table into color groups (step S422). Then, a color group to be registered is selected (step S423), and the color group table is named (step S424). Then, the color group table is added to the color group table list (step S425). Then, the flow returns to the flow shown in FIG. 10.

Figure 13:
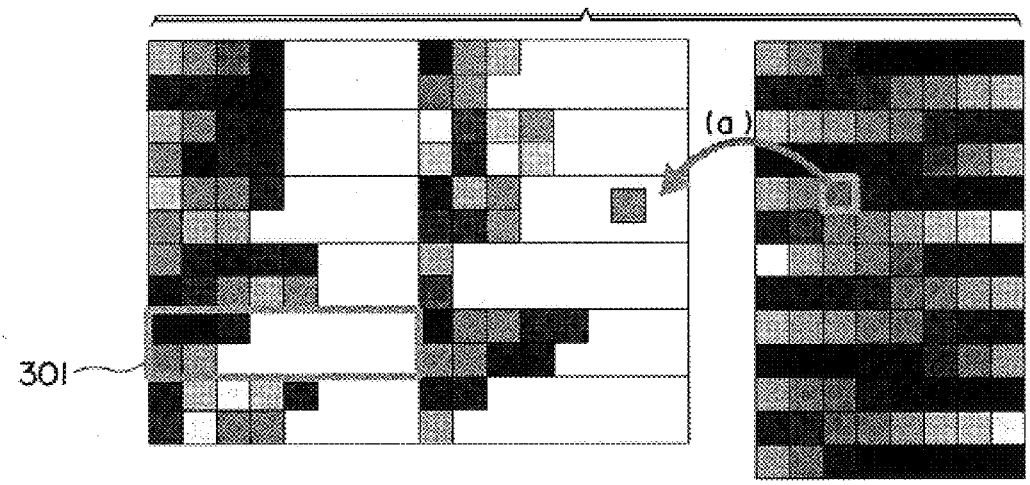
FIG. 13A is a diagram for illustrating selecting a color for a color group.

The classification (step S422) is performed in various ways. For example, in an example shown in FIG. 13, colors are selected one by one in the color table to define a color group. In FIG. 13, the color table is shown at the right hand side and a color group table is shown at the left hand side. An area 301 enclosed with a line in the color group table represents a color group, and twelve color groups are included in the color group table. For example, as shown with an arrow (a), a color in the color table is selected one by one with the mouse 4, and the selected color is moved to a color group in the color group table with a drag and drop operation with the mouse 4. Thus, colors belonging to each color group in the color group table are set with the drag and drop operation.

Figure 14:
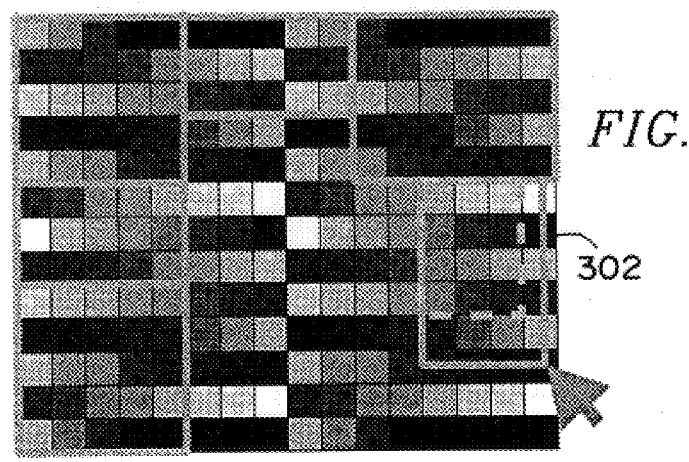
FIG. 14 is a diagram for illustrating selecting a group of colors for a color group.

FIG. 14 shows an example of another method for the classification where the color table is divided into areas of adjacent colors, each area being defined as a color group. An area is defined by operating the mouse 4. For example, an area 302 is selected as a color group with the mouse 4. The shape of the region is not limited to a square, but it may be an oval or a loop defined freely by a user. For example, when the color table is arranged as a combination of hue, value and chroma as shown in FIG. 6, colors in the color table is enclosed with a polygon to set a color group.

FIG. 15 is a flowchart of "change" (step S43 in FIG. 10) for changing a color group in the color group table. First, a list of color group tables is shown in the display device 2, as shown in FIG. 16 (step S431). Next, a color group table is selected by a user in the color group table list (step S432), and the selected color group table and the color table are displayed in the display device 2 (step S433). Then, the user changes a color group in the color group table or forms a new color group (step S434). Then, color groups to be registered as color groups are selected by the user (step S435), and the selected color group table at step S432 is updated with the selected color groups at step S435 (step S536). Then, the flow returns to the flow shown in FIG. 10.

In this example, all the colors in a color table is classified to any of the color groups in the color group table. In other words, each color group table has all the colors belonging to the color table. However, a color group table may not necessarily have all the colors in the color table.

FIG. 17 shows a flowchart of "input image data" (step S5 in FIG. 4). In this flow, characteristic colors of an image are decided automatically as colors which represent characteristics of the image using image data of the image written newly to or stored in the hard disk drive 6, and the colors decided automatically or colors selected manually by the user are added to the image data as retrieve keys. First, if the image input is decided to be an input of a new image (YES at step S51), the image data is received (step S52). Otherwise an image data already stored in the hard disk drive 6 is selected (step S53). Then, colors as characteristic colors are decided automatically from the new or selected image data (step S54). Next, it is decided by a user if the colors decided automatically as characteristic colors are added as retrieve keys to the image data (step S55). If the colors are decided to be added, the decided colors are added to the image data (step S56). Otherwise it is decided that characteristic colors are set manually. Then, the color table is displayed in the display device 2 (step S57), and colors selected by the user in the color table are added as retrieve keys to the image data (step S58). After other data are added to the image data (step S59), the flow returns to the main routine.

The selection at step S55 is performed within a predetermined period by displaying a selection screen in the display device 2. In a modified example, the colors decided automatically at step S54 are added always to the image data irrespective of the selection by the user.

The addition of the colors as retrieve keys at steps S56 and S58 means that the data of the hue, value and chroma of the added colors or data specifying the data are stored in the color data storage area 61 in the hard disk drive 6 specified on the image data to be processed. Then, the colors can be used as retrieve keys.

FIG. 18 is a flowchart of automatic color decision (step S54 in FIG. 17). First, a counter is provided and reset for each color in the color table (step S541). Further, a counter is provided and reset for each color group in the color group table selected at step S47 for deciding characteristic colors (step S542). The image is divided into N sections where N denotes a natural number (step S543). In an example, N=25. Next, representative colors are sampled for each section (steps S544–S547). First, a variable I of the sections is set at one (step S544). If the variable I is decided to be smaller than the limit (N+1) (YES at step 545), representative colors are sampled on the I-th section (step S546, refer to FIG. 19). Then, the variable I is incremented by one (step S547) and the flow returns to step S545. If the variable I is decided to reach to N+1 at step S545, all the sections have been processed, and characteristic color decision process is executed (step S548, refer to FIG. 20). Then, the flow returns to the flow shown in FIG. 17.

There are various methods for the division at step S543. For example, the image is divided by setting the number of the sections at a predetermined number. In another example, the image is divided by setting the size of the section at a predetermined size. It is also possible to combine the above-mentioned two examples by taking the size of the image into account. In a different example, the image is not divided. On the other hand, a color may be sampled for each pixel, without dividing the image.

FIG. 19 is a flowchart of the sampling of representative colors (step S546 in FIG. 18). The same color as or a similar color to the color of the largest frequency in a section is selected in the color table as a representative color of the section (step S5461). Next, the counter of the color selected as the representative color is incremented by one for counting the frequency thereof in the image (step S5462), and the counter of the color group including the selected color is incremented by one for counting the frequency thereof in the image (step S5463). Then, the flow returns to the flow shown in FIG. 18.

Figure 20:
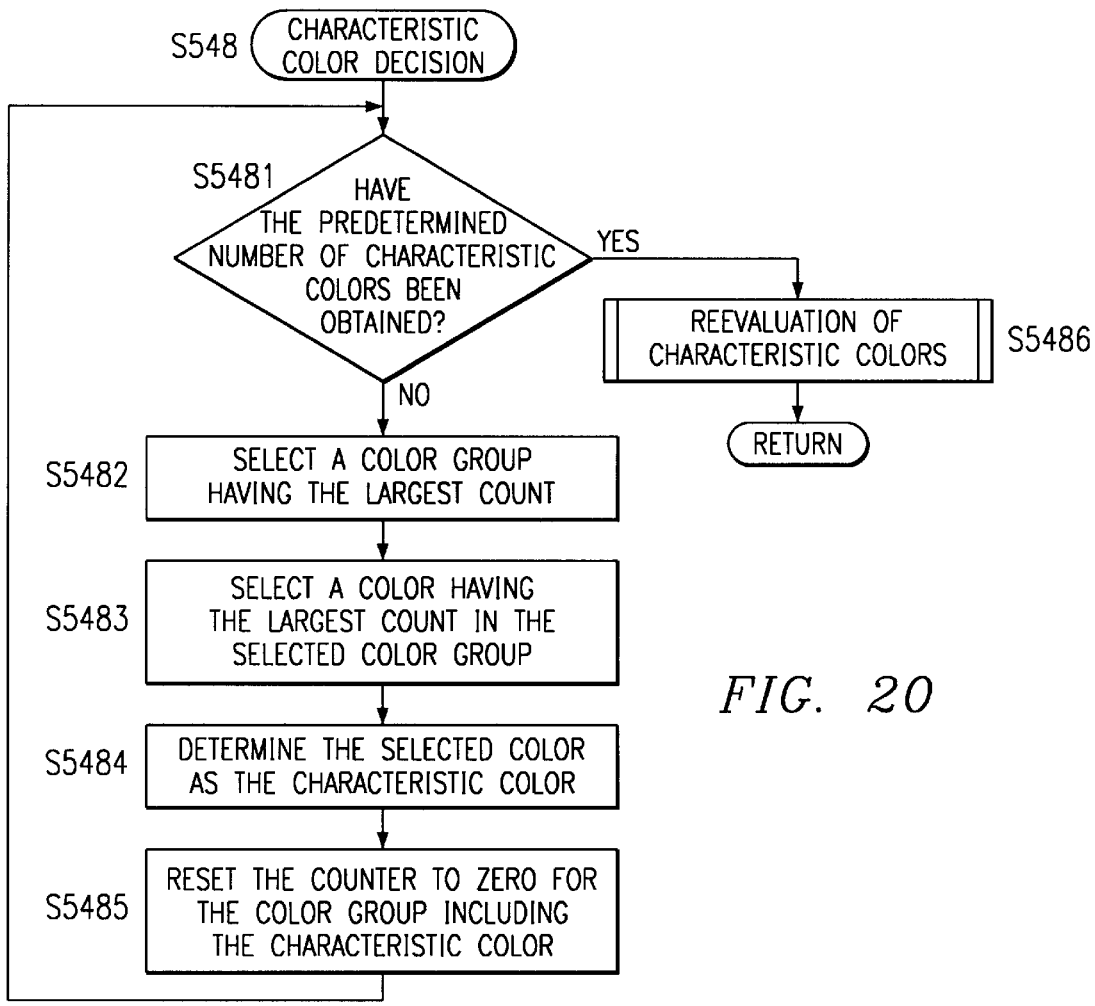
FIG. 20 is a flowchart of the decision of characteristic colors.

FIG. 20 is a flowchart of the decision of characteristic colors (step S548 in FIG. 18). Until a predetermined number of characteristic colors are obtained (NO at step S5481), the processing of steps S5482–S5485 is repeated to select characteristic colors in an image based on the counts (or frequencies) on the colors and on the color groups detected in the sampling of colors (step S546 in FIG. 18) in the unit of section. The number of characteristic colors is predetermined by a user by taking into account the necessary number for retrieve keys and the number of colors deleted from the characteristic colors in a re-evaluation process.

First, a color group having the largest count (or frequency) is selected among the color groups in the color group table (step S5482). Then, a color having the largest count is selected in the selected color group (step S5483), and the selected color is determined as a characteristic color (step S5484). Then, the counter of the color group including the characteristic color is reset to zero to prevent the selection of the same color group (step S5485), and the flow returns to step S5481. Thus, one color is selected from each color group as the characteristic color in the order of the frequency of the color group. Because a color group is a set of similar colors, the process prevents similar colors that have large areas in the image from being selected as characteristic colors. After the predetermined number of characteristic colors are obtained (YES at step S5481), characteristic colors are evaluated again (step S5486). Then, the flow returns to the flow of FIG. 18.

A different processing may be adopted instead of the processing of steps S5482–S5485. For example, two or more characteristic colors are selected from each color group. The re-evaluation at step S5486 may be omitted to adopt all the characteristic colors selected at the processing of steps S5482–S5485. In a different way, all the colors in the color group having the largest frequency may be decided as characteristic colors on the premise that the re-evaluation at step S5486 will be executed.

Figure 21:
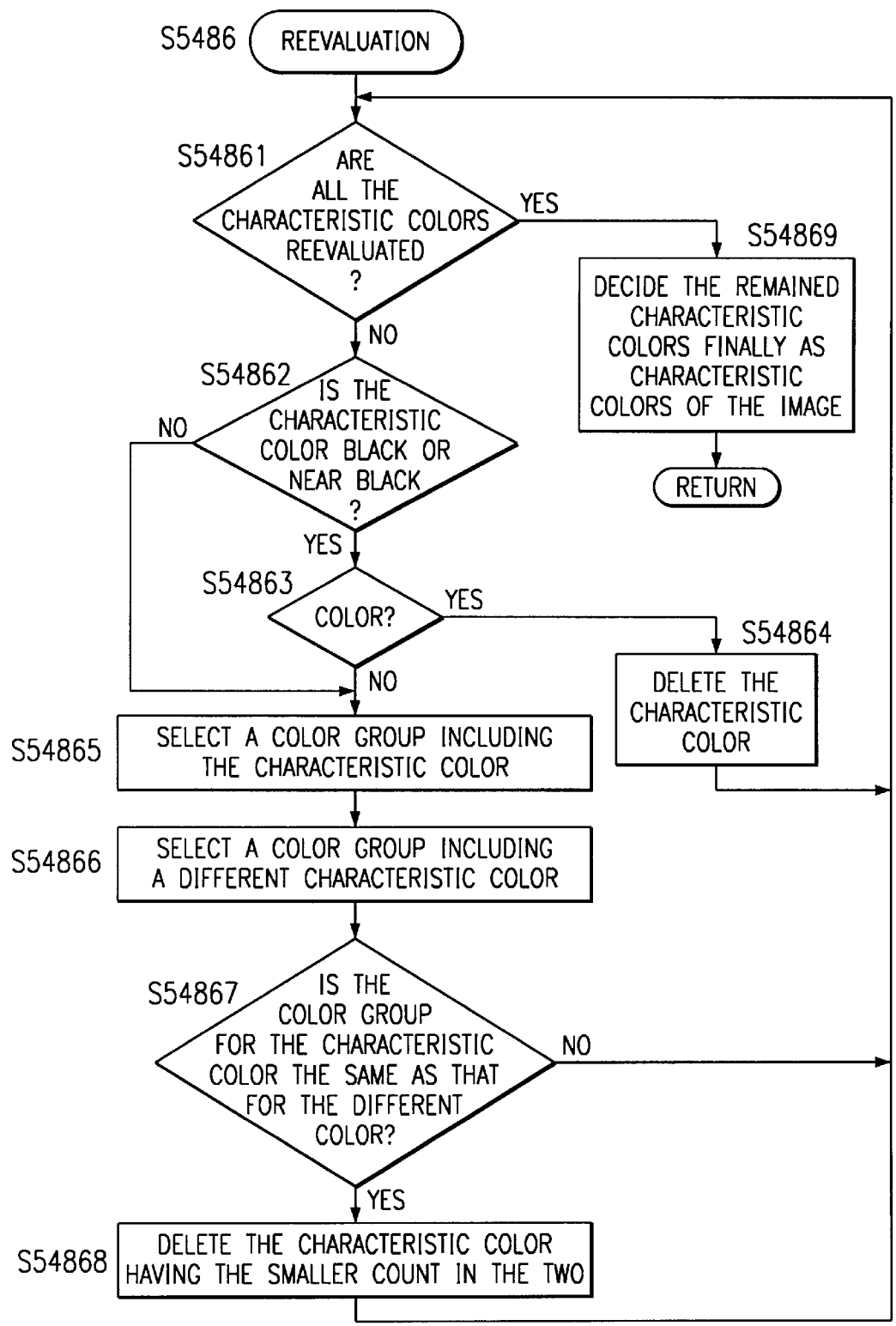
FIG. 21 is a flowchart of re-evaluation of characteristic colors.

FIG. 21 shows a flowchart of re-evaluation of characteristic colors (step S5486 in FIG. 20). In this flow, colors which do not have to be selected as characteristic colors may be deleted in the colors which have been selected in the decision of characteristic colors explained above. Until all the characteristic colors are re-evaluated (NO at step S54861), the processing of steps S54862–S54868 is repeated. First, colors which are not suitable as retrieve keys are deleted among the selected characteristic colors. That is, if a characteristic color is black or a color similar to black (YES at step S54862) and if the characteristic color is a chromatic color (YES at step S54863), it is deleted from the characteristic colors (step S54864) because it is decided as a black shadow in the image, and the flow returns to step S54861. The decision at step S54862 is performed based on value. If the characteristic color is decided to be a suitable color (NO at step S54862, or YES at step S54862 and NO at step S54863), characteristic colors are evaluated again with a color group table different from the table used in the above-mentioned decision of the characteristic colors in order to select characteristic colors not similar to each other. First, a color group including the characteristic color under evaluation is selected in the color group table selected for re-evaluation at step S47 in FIG. 10 (step S54865). Next, another color group including a characteristic color different from that under evaluation is selected in the color group table selected for re-evaluation (step S54866). Then, it is decided if a different characteristic color is included in the color group including the characteristic color under re-evaluation (YES at step S54867), the color having the smaller count is deleted from the characteristic colors (step S54868), and the flow returns to step S54861. IF the different characteristic color is decided not to be included (NO at step S54867), the flow readily returns to step S54861. After all the characteristic colors are re-evaluated (YES at step S54861), the remained characteristic colors are decided as final characteristic colors (step S54869). Then, the flow returns to the flow of FIG. 20.

The deletion of colors of black or similar to black may be omitted. A color similar to black is for example a dark gray. Dark chromatic colors may be included in the colors similar to black.

Figure 22:
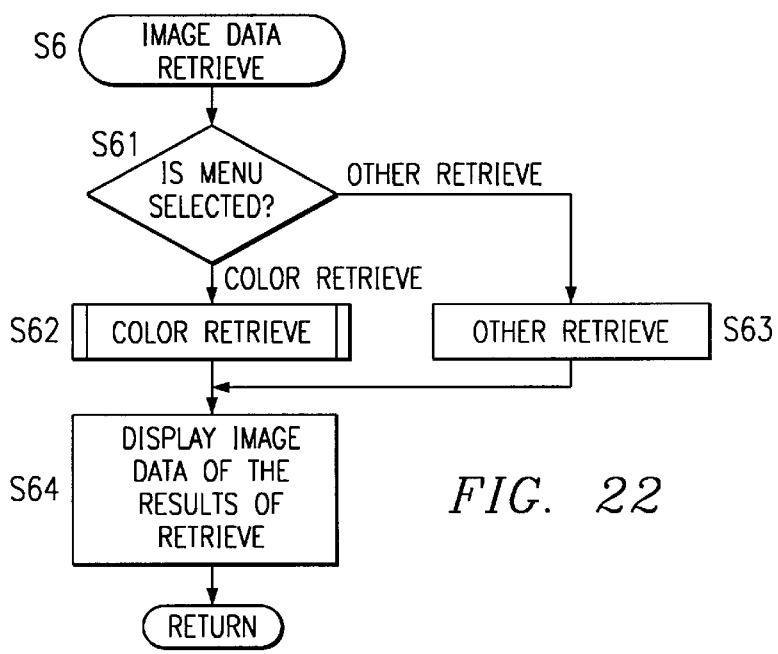
FIG. 22 is a flowchart of image data retrieve.

FIG. 22 shows a flowchart of image data retrieve (step S6 in FIG. 4). In this flow, image data are retrieved with retrieve keys in the image database. First, it is decided if a menu is selected (step S61). The menu is selected with the keyboard 3 or the mouse 4. When color retrieve is selected, an image data is retrieved with colors as retrieve keys (step S62). When other retrieve is selected, retrieve is performed according to the selected item for example by using keywords or forms as retrieve keys (step S63). Then, the image data retrieved are displayed in the display device 2 (step S64), and the flow returns to the main routine. The processing of the other retrieve (step S63) is not explained further because it is not related directly to the invention.

Figure 23:
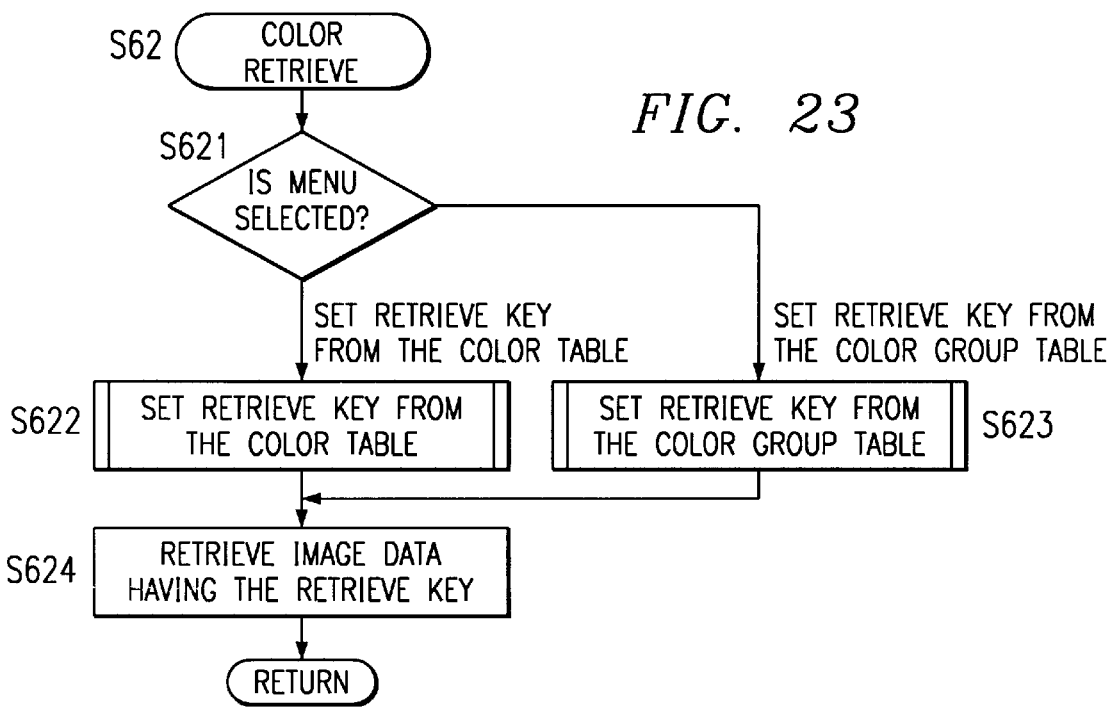
FIG. 23 is a flowchart of color retrieve.

FIG. 23 shows a flowchart of color retrieve (step S62 in FIG. 22). First, it is decided if a menu is selected (step S621). When "set retrieve key from the color table" is selected, a color is selected from the color table (step S622). When "set retrieve key in the color group table" is selected, a color to be set as retrieve keys is selected from the color group table (step S623). Then, an image data having the retrieve key is retrieved in the image database (step S624). Then, the flow returns to the flow of FIG. 22.

Figure 24:
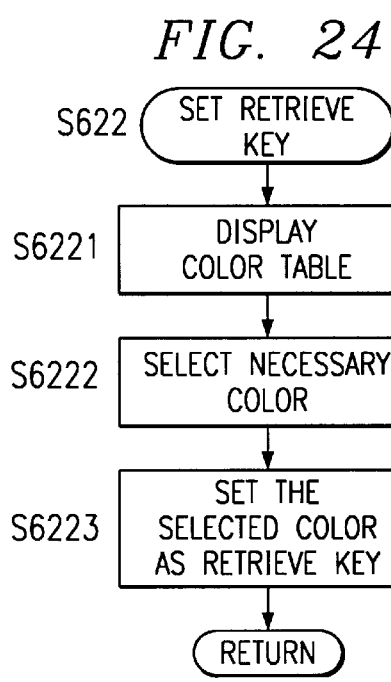
FIG. 24 is a flowchart of "set retrieve key based on the color table"

FIG. 24 shows a flowchart of "set retrieve key based on a color table" (step S622 in FIG. 23). First, the color table is displayed in the display device 2 (step S6221). Then, a color is selected with the keyboard 3 or the mouse 4 (step S6222). After the selected color is set as a retrieve key (step S6223), the flow returns to the flow of FIG. 23. In a modified example, when a plurality of colors are selected as retrieve keys at step S6222, AND or OR condition can be set at step S6223.

Figure 25:
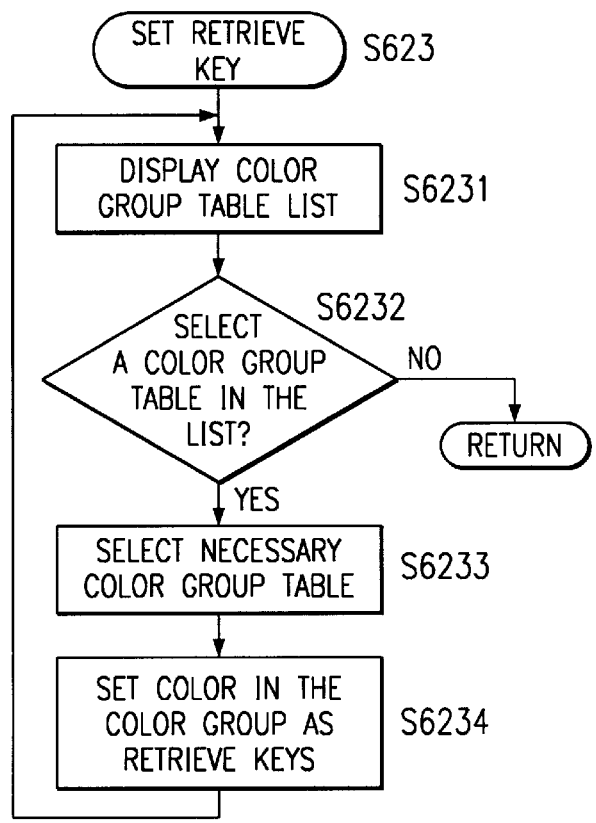
FIG. 25 is a flowchart of "set retrieve key based on the color group table".

FIG. 25 shows a flowchart of "set retrieve key based on a color group table" (step S623 in FIG. 23). First, the color group table list is displayed in the display device 2 (step S6231). If a color group table is selected (YES at step S6232), a color group desired to be retrieved key is selected with the keyboard 3 or the mouse 4 (step S6233). Then, all the colors included in the selected color group are set as retrieve keys (step S6234), and the flow returns to step S6231. If no color group table is selected (NO at step S6232), the flow returns to the flow of FIG. 23. In a modified example, when a plurality of color groups are selected as retrieve keys at step S6233, AND or OR condition can be set at step S6234. In this example, the colors in each color group are set always at OR condition.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for automatically determining colors representing characteristics of an image, the apparatus comprising:

a color table including a plurality of colors;

a first color group table that includes a plurality of color groups, each color group being obtained by classifying the plurality of colors in the color table according to a first standard;

a sampling device for sampling colors from image data of the image;

a first counter that counts, for each color in the color table, a first frequency equal to a number of times a sampled color corresponds to the respective color;

a second counter that sums, for each color group in the first color group table, the first frequencies for each color in the respective color group to produce a second frequency; and a decision device for selecting at least one characteristic color of the image based on the first frequencies and the second frequencies;

wherein the decision device selects a characteristic color from each one of the plurality of color groups in the order of the second frequency of each color group until a number of characteristic colors selected from the color aroups reaches a predetermined number, the characteristic color selected from each respective color group being a color that has a greatest first frequency in the color group among colors in the color group not previously selected as a characteristic color.

2. An apparatus in accordance with claim 1, further comprising a reevaluation device for reevaluating the colors selected by said decision device as the characteristic colors.

3. An apparatus in accordance with claim 1, wherein the sampling device samples a color included in the image for each pixel in the image.

4. An apparatus in accordance with claim 1, wherein the sampling device divides the image into a plurality of sections and samples a color included in the image for each section in the image.

5. An apparatus in accordance with claim 1, wherein the decision device selects a characteristic color for each of said plurality of color groups.

6. An apparatus for automatically determining colors representing characteristics of an image, the apparatus comprising:

a color table including a plurality of colors;

a first color group table that includes a plurality of color groups, each color group being obtained by classifying the plurality of colors in the color table according to a first standard;

a sampling device for sampling colors from image data of the image;

a first counter that counts, for each color in the color table, a first frequency equal to a number of times a sampled color corresponds to the respective color;

a second counter that sums, for each color group in the first color group table, the first frequencies for each color in the respective color group to produce a second frequency;

a decision device for selecting at least one characteristic color of the image based on the first frequencies and the second frequencies; and a reevaluation device for reevaluating the colors selected by said decision device as the characteristic colors;

wherein said reevaluation device inhibits selection by the decision device of a color as a characteristic color when the color is one of black and similar to black.

7. An apparatus for automatically determining colors representing characteristics of an image, the apparatus comprising:

a color table including a plurality of colors;

a first color group table that includes a plurality of color groups, each color group being obtained by classifying the plurality of colors in the color table according to a first standard;

a sampling device for sampling colors from image data of the image;

a first counter that counts, for each color in the color table, a first frequency equal to a number of times a sampled color corresponds to the respective color;

a second counter that sums, for each color group in the first color group table, the first frequencies for each color in the respective color group to produce a second frequency;

a decision device for selecting at least one characteristic color of the image based on the first frequencies and the second frequencies; and a reevaluation device for reevaluating the colors selected by said decision device as the characteristic colors;

a second color group table that includes a plurality of color groups, each color group being obtained by classifying the plurality of colors in the color table according to a second standard, the second standard being different from the first standard;

wherein when any two colors of the characteristic colors selected by the decision device belong to a same one of the plurality of color groups in the second color group table, the reevaluation device inhibits selection by the decision device of the respective one of the two colors having the smaller first frequency.

8. A method for automatically determining colors representing characteristics of an image, the method comprising the steps of:

providing a color table including a plurality of colors;

providing a first color group table including a plurality of color groups, each color group being obtained by classifying the plurality of colors in the color table according to a first standard;

sampling colors from image data of the image;

counting a first frequency for each color in the color table, equal to a number of times that a sampled color corresponds to the respective color;

counting a second frequency for each color group in the first color aroup table, equal to a sum of the first frequencies for each color in the respective color group; and selecting at least one characteristic color of the image based on the first frequencies and the second frequencies;

wherein a characteristic color is selected from each one of the plurality of color groups in the order of the second frequency of each color group until a number of characteristic colors selected from the color groups reaches a predetermined number, the characteristic color selected from each respective color aroup being a color that has a greatest first frequency in the color group among colors in the color group not previously selected as a characteristic color.

9. A method in accordance with claim 8, further comprising the step of:

reevaluating the colors selected as the characteristic colors.

10. A method in accordance with claim 8, wherein a color included in the image is sampled for each pixel in the image.

11. A method in accordance with claim 8, wherein the image is divided into a plurality of sections, and a color included in the image is sampled for each section in the image.

12. A method in accordance with claim 8, wherein only one characteristic color is selected for an image, the characteristic color being a color having a largest first frequency from a color group that has a largest second frequency.

13. A method for automatically determining colors representing characteristics of an image, the method comprising the steps of:

providing a color table including a plurality of colors;

providing a first color group table including a plurality of color groups, each color group being obtained by classifying the plurality of colors in the color table according to a first standard;

sampling colors from image data of the image;

counting a first frequency for each color in the color table, egual to a number of times that a sampled color corresponds to the respective color;

counting a second frequency for each color group in the first color aroup table, equal to a sum of the first frequencies for each color in the respective color group;

selecting at least one characteristic color of the image based on the first frequencies and the second frequencies; and reevaluating the colors selected as the characteristic colors, wherein the reevaluating step inhibits the selection of a color as a characteristic color when the color is one of black and similar to black.

14. A method for automatically determining colors representing characteristics of an image, the method comprising the steps of:

providing a color table including a plurality of colors;

providing a first color group table including a plurality of color groups, each color group being obtained by classifying the plurality of colors in the color table according to a first standard;

sampling colors from image data of the image;

counting a first frequency for each color in the color table, equal to a number of times that a sampled color corresponds to the respective color;

counting a second frequency for each color group in the first color group table, equal to a sum of the first frequencies for each color in the respective color group;

selecting at least one characteristic color of the image based on the first frequencies and the second frequencies; and reevaluating the colors selected as the characteristic colors, providing a second color group table that includes a plurality of color groups, each color group being obtained by classifying the plurality of colors in the color table according to a second standard, the second standard being different from the first standard;

wherein when any two colors of the characteristic colors selected in the selecting step belong to a same one of the plurality of color groups in the second color group table, the respective one of the two colors having the smaller first frequency is inhibited from being selected as a characteristic color by the reevaluating step.

15. A computer program product stored in a recording medium executable by a computer for automatically determining colors which represent characteristics of image, comprising:

a sampling means for sampling colors from image data of the image;

a first counter that counts, for each color in a color table, a first frequency, said color table including a plurality of colors, said first frequency equal to a number of times a sampled color corresponds to the respective color in the color table;

a second counter that counts, for each color croup included in a first color group table, a second frequency, said first color group table including a plurality of color groups, each of the plurality of color groups obtained by classifying the plurality of colors in the color table according to a first standard, said second frequency being a sum of said first frequencies for each color in the respective color group; and a decision means for selecting at least one characteristic color of the image based on the first frequencies and second frequencies;

wherein the decision means selects a characteristic color from each one of the plurality of color groups in the order of the second frequency of each color group until a number of characteristic colors selected from the color groups reaches a predetermined number, the characteristic color selected from each respective color group being a color that has a greatest first frequency in the color group amona colors in the color aroup not previously selected as a characteristic color.

16. A computer program product in accordance with claim 15, further comprising a reevaluation means for reevaluating the colors selected by the decision means as the characteristic colors.

17. A computer program product in accordance with claim 15, wherein the sampling means samples a color included in the image for each pixel in the image.

18. A computer program product in accordance with claim 15, wherein the sampling means divides the image into a plurality of sections and samples a color included in the image for each section in the image.

19. A computer program product stored in a recording medium executable by a computer for automatically determining colors which represent characteristics of image, comprising:

a sampling means for sampling colors from image data of the image;

a first counter that counts, for each color in a color table, a first frequency, said color table including a plurality of colors, said first frequency equal to a number of times a sampled color corresponds to the respective color in the color table;

a second counter that counts, for each color group included in a first color group table, a second frequency, said first color group table including a plurality of color groups, each of the plurality of color aroups obtained by classifying the plurality of colors in the color table according to a first standard, said second frequency being a sum of said first frequencies for each color in the respective color group;

a decision means for selecting at least one characteristic color of the image based on the first frequencies and second frequencies; and a reevaluation means for reevaluating the colors selected by the decision means as the characteristic colors, wherein the reevaluation means inhibits selection by the decision means of a color selected as a characteristic color when the color is one of black and similar to black.

20. A computer program product stored in a recording medium executable by a computer for automatically determining colors which represent characteristics of image, comprising:

a sampling means for samplina colors from image data of the image;

a first counter that counts, for each color in a color table, a first frequency, said color table including a plurality of colors, said first frequency equal to a number of times a sampled color corresponds to the respective color in the color table;

a second counter that counts, for each color group included in a first color group table, a second frequency, said first color group table including a plurality of color aroups, each of the plurality of color groups obtained by classifying the plurality of colors in the color table according to a first standard, said second frequency being a sum of said first frequencies for each color in the respective color group;

a decision means for selecting at least one characteristic color of the image based on the first frequencies and second frequencies; and a reevaluation means for reevaluating the colors selected by the decision means as the characteristic colors, wherein when anv two colors of the characteristic colors selected by the decision means belong to a same one of the plurality of color groups in a second color group table, the reevaluation means inhibits selection by the decision means of the respective one of the two colors having the smaller first frequency, said second color group table including a plurality of color groups, said plurality of color groups of said second color group table being obtained by classifying the plurality of colors included in the color table according to a second standard, said second standard being different from the first standard.

21. An apparatus for automatically determining colors representing characteristics of an image, the apparatus comprising:

a color table including a plurality of colors;

a first color group table that includes a plurality of color groups, each color group being obtained by classifying the plurality of colors in the color table according to a first standard;

a sampling device for sampling colors from image data of the image;

a first counter that counts, for each color in the color table, a first frequency equal to a number of times a sampled color corresponds to the respective color;

a second counter that sums, for each color group in the first color group table, the first frequencies for each color in the respective color group to produce a second frequency;

a decision device for selecting at least one characteristic color of the image based on the first frequencies and the second frequencies; and a reevaluation device for reevaluating the characteristic colors selected by the decision device according to a predetermined criteria.

* * * * *

UNITED STATES PATENT AND TRADEMARK OFFICE
CERTIFICATE OF CORRECTION

PATENT NO : 5,995,087
DATED : November 30, 1999
INVENTOR(S) : Sumiyo TANAKA

It is certified that error appears in the above-identified patent and that said Letters Patent is hereby corrected as shown below:

Column 10, claim 1, line 31, delete "aroups" and insert --groups--.

Column, 11, claim 8, line 51, delete "aroup" and insert --group--.

Column, 11, claim 8, line 62, delete "aroup" and insert --group--.

Column 12, claim 13, line 21, delete "egual" and insert --equal--.

Column, 12, claim 13, line 23, delete "aroup" and insert --group--.

Column 13, claim 15, line 7, delete "croup" and insert --group--.

Column 13, claim 15, line 24, delete "amona" and insert --among--.

Column 13, claim 15, line 24, delete "aroup" and insert --group--.

UNITED STATES PATENT AND TRADEMARK OFFICE
CERTIFICATE OF CORRECTION

PATENT NO : 5,995.087
DATED : November 30, 1999
INVENTOR(S): Sumiyo TANAKA

It is certified that error appears in the above-identified patent and that said Letters Patent is hereby corrected as shown below:

Column 13, claim 19, line 50, delete "aroups" and insert --groups--.

Column 14, claim 20, line 5, delete "samplina" and insert --sampling--.

Column 14, claim 20, line 16, delete "aroups" and insert --groups--.

Column 14, claim 20, line 26, delete "anv" and insert --any--.

Signed and Sealed this

Twenty-seventh Day of March, 2001

Attest:

NICHOLAS P. GODICI

Attesting Officer    Acting Director of the United States Patent and Trademark Office